Patented May 31, 1932

1,861,382

UNITED STATES PATENT OFFICE

ALFRED DAVIDSON, ANTHONY JAMES HAILWOOD, FRED HENESEY, AND ARNOLD SHEPHERDSON, OF MANCHESTER, ENGLAND, ASSIGNORS TO IMPERIAL CHEMICAL INDUSTRIE LIMITED, OF WESTMINSTER, ENGLAND

PRODUCTION AND MANUFACTURE OF STABLE LEUCO-INDIGO PREPARATIONS

No Drawing. Application filed April 11, 1930, Serial No. 443,610, and in Great Britain April 15, 1929.

This invention relates to the production and manufacture of leuco-indigo preparations which are stable and highly concentrated so as to be suitable for transport over long distances, and comprises improved methods having advantages which will appear from the description.

The production of stable, highly concentrated preparations of leuco-indigo is of special importance in relation to the supply of leuco-indigo to eastern countries, where a considerable proportion of it is used to feed the fermentation indigo vats. It will be appreciated that the preparation of a leuco-indigo which will, in addition to serving the ordinary purposes, be suitable for addition to the fermentation vat presents a problem of considerable difficulty. In the first place it must be stable in order to survive the long transport and relatively unskilled handling, and the cost of transport must be minimized by making it highly concentrated. Further, the preparation must contain nothing injurious to the ferments, that is, nothing having antiseptic properties, and this condition rules out many of the methods of reduction commonly employed unless a laborious and costly removal of the accompanying by-products be undertaken.

Leuco-indigo preparations are made by reducing indigo pastes in various ways; many of these methods involving the formation of zinc salts as by-products. There are other methods wherein alkali and glucose can be used, but ordinarily these involve the use of relatively large amounts of alkali, which, upon neutralization, burden the paste with a large amount of inorganic salts which are not desirable.

In these methods of reduction, it is customary to use the ordinary finely divided indigo paste, as in the Schlieper and Baum printing process. In these ordinary pastes, the indigo particles are of the order of magnitude of 10 to 40 mu.

We have found that by using indigo dispersions with a particle magnitude much less, it is possible to effect satisfactory reduction with as little as 0.6 molecules of glucose and 4 molecules of alkali per molecule of indigo. Not more than 5 molecules of alkali are used in the present process.

To produce indigo particles of this high order of dispersion, ordinary indigo preparations may be peptized with such a protective colloid as that contained in "sulphite cellulose pitch" (a sulphite waste liquor preparation).

With the use of the moderate amounts of alkali and reducing sugar in making leuco-indigo from indigo pastes with particle fineness of this order, the by-products formed contain an amount of inorganic salts innocuous when the paste is added to the fermentation vat. Moreover, there is the additional advantage that with this order of dispersion, indigo pastes may be obtained in highly concentrated form with reduction to leuco-indigo in similar concentration.

In carrying out our invention we may use as the reducing sugar, glucose or an invert sugar from beet-molasses or other source. The concentration of the dispersed indigo paste may vary within wide limits, and any suitable temperature may be employed. The product may be conditioned by the addition of molasses and glues or other albuminous or proteid material. As starting-material indigo containing indigoid or thioindigoid shading dyes may be used in place of pure indigo.

Our invention thus comprises the reduction of highly dispersed indigo to leuco-indigo by means of a reducing sugar in the presence of a limited amount of alkali. It further comprises the leuco-indigo when so obtained, and preparations containing such leuco-indigo with or without further addenda.

The following example illustrates our invention without limiting it; the parts are by weight.

*Example*

20 parts of indigo powder is converted, by milling in a Werner-Pfleiderer mixer with 1 part of sulphite cellulose pitch and a suitable quantity of water, into a paste containing 44 per cent of its weight of indigo in a highly dispersed form. To this paste is added 18 parts of a 50 per cent invert sugar mixture produced by inversion of the sugar in cane molasses. After mixing thoroughly, 27 parts of a 50 per cent caustic soda solution is added with continued stirring. The mixer is then immediately covered and a stream of coal-gas or other suitable inert gas led through while the mixture is heated to 75° C., so that the reduction of the indigo is accomplished in an air-free atmosphere. The reduction is complete in 10–15 minutes at 75° C., after which the mixture is cooled to 25–30° C. and is neutralized by gradual addition of concentrated hydrochloric acid. There is thus obtained about 117 parts of a 17 per cent paste of indigowhite, which may be concentrated by evaporation or filtration, and which by addition of molasses, glue and similar materials yields a stable thick paste of indigowhite.

Pastes of higher indigowhite content may be obtained by using more highly concentrated pastes of dispersed indigo in the operation described.

Having now particularly described and ascertained the nature of our said invention and in what manner the same is to be performed, we declare that what we claim is:—

1. In the manufacture of leuco-indigo, the process which comprises peptizing indigo to produce an aqueous dispersion with a particle size of about 3 mu or less and reducing the dispersion by a reducing sugar in the presence of an alkali.

2. A process according to claim 1 in which the reducing sugar is present in a proportion of less than 1 molecule per molecule of indigo and the alkali is present in a proportion of less than 5 molecules per molecule of indigo.

3. Leuco-indigo pastes containing completely reduced indigo in the presence of less than 5 molecules of alkali per molecule of indigo, said pastes being free of materials having anti-fermentative value.

In testimony whereof we affix our signatures.

ALFRED DAVIDSON.
ANTHONY JAMES HAILWOOD.
FRED HENESEY.
ARNOLD SHEPHERDSON.